Feb. 24, 1953         F. W. LEFFER         2,629,684
METHOD AND APPARATUS FOR EFFECTING THE CATALYTIC CONVERSION
OF AN ORGANIC REACTANT STREAM, PARTICULARLY A LIQUID CHARGE
Filed Oct. 13, 1948
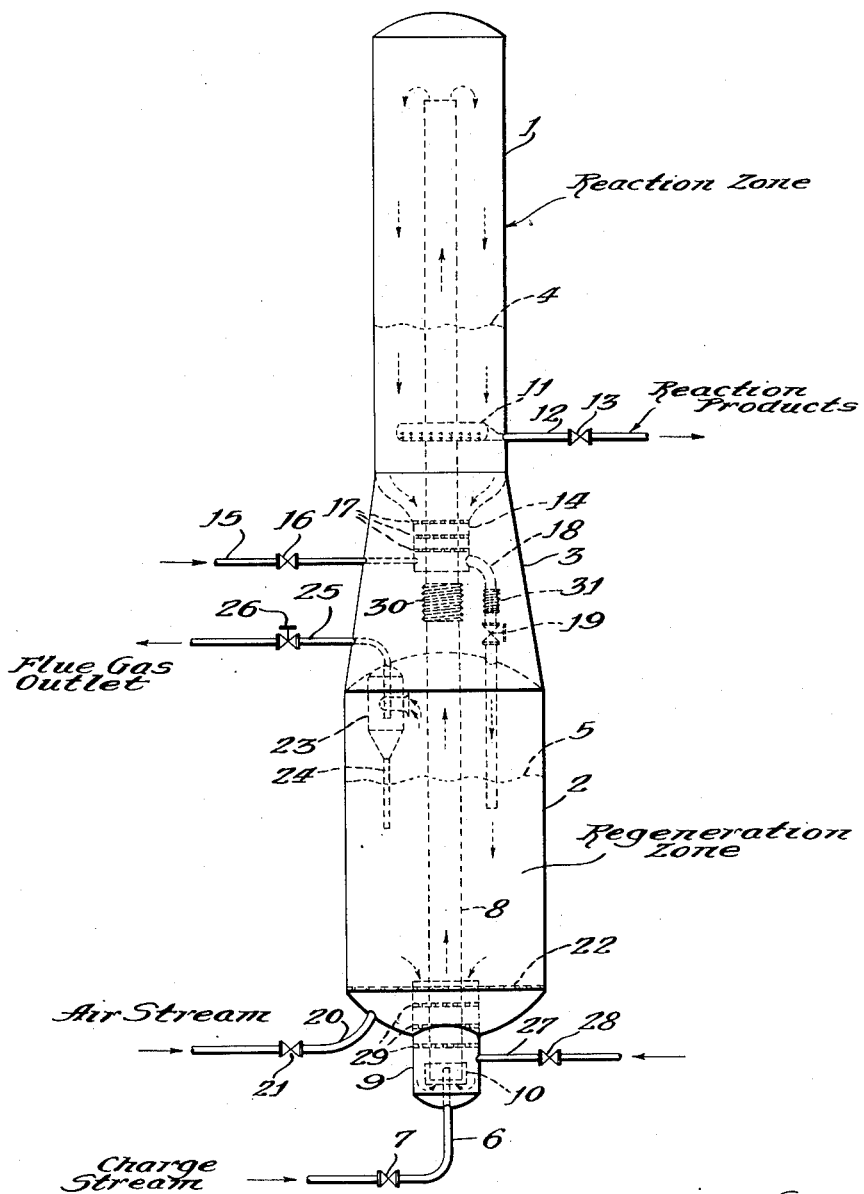
Inventor:
Frederick W. Leffer
By: Maynard P. Venema
Attorney
Philip T. Liggett
Agent Patented Feb. 24, 1953

2,629,684

UNITED STATES PATENT OFFICE 2,629,684

METHOD AND APPARATUS FOR EFFECTING THE CATALYTIC CONVERSION OF AN ORGANIC REACTANT STREAM, PARTICULARLY A LIQUID CHARGE

Frederick W. Leffer, Riverside, Ill., assignor to Universal Oil Products Company, Chicago, Ill., a corporation of Delaware Application October 13, 1948, Serial No. 54,308

10 Claims. (Cl. 196—52)

This invention relates to an improved method and apparatus for effecting the catalytic conversion of fluid organic reactants, the operation being particularly adaptable to the conversion of liquid hydrocarbon charge streams. The arrangement of the contacting zones and the flow through the unit are such as to provide a concurrent flow of the reactant stream and subdivided solid catalyst within the reaction zone and countercurrent flow between the used catalyst particles and a gasiform regenerating medium within the regenerating zone, as well as means for utilizing and retaining a maximum amount of heat within the unit.

It is a principal object of this invention to provide an improved method for converting a fluid organic reactant stream in the presence of solid catalyst particles maintained in circulation through a reaction zone and a regenerating zone in a compact contacting unit.

It is also a major object of the invention, to provide an operation permitting the concomitant contacting of the catalyst particles in concurrent flow with a stream of the organic reactant and in countercurrent flow with a stream of regenerating medium in reaction and regenerating zones closely coupled in a compact contacting unit. Another object is the coordination of separate confined reaction and regenerating zones in such a compact manner that by far the overwhelming portion of the path traversed by the circulating catalyst outside the regenerating zone is utilized for concurrent flow contact with the reactant stream.

A further object of the invention is the conversion of the reactant during its flow concurrently with the catalyst particles maintained first in a state of suspension and then in a descending compact bed of variable and readily controllable depth within the reaction zone, while the catalyst regeneration is effected during the passage of the regenerating gas stream countercurrently through a bed of the catalyst particles in the regenerating zone at a velocity sufficient to fluidize the bed therein.

It is a further object of the improved operation to utilize the heat from the regenerated catalyst and from the regenerating zone both directly and indirectly to flash-vaporize a liquid charge and to supply the endothermic heat requirements of the conversion, and in a more specific aspect of this object the invention aims at an improved method for catalyzing the vapor-phase endothermic conversion of normally liquid hydrocarbons at high temperatures.

It is a still further object of the invention to utilize the incoming reactant stream for lifting the regenerated catalyst particles from the regenerating zone to an elevated contacting zone through a confined elongated path adapted for accomplishing a substantial portion of the desired catalytic conversion with completion of the latter in the elevated zone.

Other objects and advantages of the improved operation of this invention will become apparent from the subsequent description.

In a broad aspect, the present method for effecting the catalytic conversion of a fluid organic reactant stream comprises, maintaining a downwardly moving bed of finely divided solid catalyst particles in each of two contacting zones disposed in vertical alignment with one another, withdrawing regenerated catalyst particles downwardly from the lower portion of the lower zone and commingling them with the reactant stream, effecting the conversion of the reactant while passing the mixture upwardly in a confined straight line path through each of the catalyst beds in the superimposed zones into the top portion of the upper zone and therefrom downwardly through the upper zone in a continuous concurrent flow, separately withdrawing a fluid conversion product stream from the lower portion of the upper zone and passing the used catalyst particles therefrom into the upper portion of the lower contacting zone, passing a gasiform regenerating medium upwardly through the latter zone countercurrently to the descending catalyst particles, discharging used regenerating medium from the upper portion of the lower zone and withdrawing regenerated particles from the lower portion thereof for commingling with the reactant stream as aforesaid.

The principles and conditions of moving and fluidized bed catalytic conversion operations are now well known to the chemical and petroleum arts and need not be described in detail herein. The catalysts utilizable in the present method generally are those which are capable of regeneration upon contamination or inactivation during the conversion of the reactant and which substantially retain their solid subdivided state under the conditions to which they are exposed. The catalyst used may be in either the so-called powdered form or in a specially prepared spheroidal form, and the latter form of catalyst is preferred because of its generally greater ease of fluidization and lesser tendency of causing erosion of the apparatus in which it is used.

The type of catalyst used will of course depend upon the type of conversion to be catalyzed by it. The present method of operation is applicable to the catalytic conversion of hydrocarbon charging stocks, such as the production of gasoline by cracking of higher boiling hydrocarbon oils, the reforming of naphthas and gasoline fractions for the improvement of their motor fuel values, the cracking of normally liquid charging stocks into normally gaseous olefinic hydrocarbon mixtures, the aromatization of liquid hydrocarbon oil fractions initially low in aromatic content, the production primarily of olefinic liquid fractions of kerosene boiling characteristics from substantially paraffinic charging stocks of higher boiling characteristics, including paraffin wax fractions, and the dealkylation of alkyl-aromatic hydrocarbons, more particularly of mono- or poly-alkylated hydrocarbons in which at least one alkyl group contains two or more carbon atoms, in the presence of hydrogen (or a hydrogen donor such as a napthene) to form mono- or polymethylated aromatic hydrocarbons, such as the production of toluene from ethyl-, propyl- or butylbenzene. For each of these hydrocarbon conversion reactions, appropriate solid catalysts are available in the art and need not be described here in detail. Preference is given in the present method, however, to those of the various catalysts which are highly refractory and capable of regeneration by treatment with an oxidizing gas stream at temperatures at which carbonaceous contaminants are burned from the used catalyst and simultaneously therewith the activity is substantially restored. Activated natural composites of the type of activated montmorillonite and similar clays may thus be used as catalyst in the cracking of hydrocarbon oils. Preference is given in the present method, however to the synthetically prepared composites comprising an oxidic base or carrier of relatively low activity and at least one metal compound as promoter or component of higher activity, such as for example the synthetic composites of silica with magnesia or with one or more of the oxides of aluminum and zirconium, preferred for catalyzing hydrocarbon cracking reactions of the aforementioned character, and the composites of alumina or magnesia with oxides of chromium, molybdenum, or vanadium, suitable for use in the hydrocarbon reforming, aromatization, dehydrogenation and dealkylation reactions contemplated herein.

While the present method is described in greater detail below primarily with reference to hydrocarbon conversion reactions, it is realized that with suitable adjustments in the operating conditions of temperature and time it may be applied advantageously also to other organic reactions, such as for example the catalytic dehydration or controlled dehydrogenation of oxygenated hydrocarbon compounds. Among the reactions contemplated and performable at elevated temperatures with refractory catalysts, capable of regeneration by treatment with oxidizing gases, the following are typical: Vaporphase dehydration of aliphatic alcohols to olefins in the presence of catalytic composites of silica with one or more of the compounds alumina, zirconia, thoria and blue oxide of tungsten; vaporphase dehydration of phenols with similar catalysts such as the conversion of phenol to diphenyl oxide using an alumina-thoria or similarly effective composite catalyst; manufacture of ketones from the lower organic acids, especially of acetone from acetic acid, using a synthetic silica-alumina catalyst or a similar catalyst comprising as active component, one or more compounds of the group consisting of the oxides of aluminum, thorium, chromium and zinc; conversion of alcohols with steam into ketones over silica-thoria catalyst; and production of aliphatic amines by reaction of the corresponding alcohol vapor with ammonia in the presence of a silica-alumina catalyst.

In all of the modes of application referred to, the solid catalyst particles are transported, in accordance with the present invention, from the lower portion of the catalyst regenerating zone as a suspension of fluidized column with the reactant stream to the upper portion of the upper contacting zone and thereafter pass downwardly within this upper zone in a descending compact bed concurrently with the reactant stream, while, in the lower regenerating zone, the particles are contacted countercurrently with the stream of regenerating medium. Thus, the size of the catalyst particles must be such that a fluidized contact is maintained within the unit and of such size as to permit the lifting of the particles through an internal conduit without the necessity of such excessive velocity of the ascending fluid as would give rise to erosion of the riser or transfer conduit defining the upward straight line path, or undue attrition of the solid particles. Generally, catalyst particles of less than 2 mm. diameter should be used; spheroidal particles of between 0.01 and 0.8 mm. diameter are preferred, and within this range the best average size has been found to be 45-100 microns.

A particularly advantageous feature of the present method of operation, is that it is adapted to accommodate not only vaporous reactant streams but also a liquid charge or a mixture of liquid and vapor. The liquid charge stream is sprayed or otherwise introduced into the lower end of an internal transfer or riser conduit, at the point where the catalyst particles are withdrawn from the regenerating zone in a hot reactivated condition. The hot catalyst particles mixing with the liquid charge stream vaporize the latter and are then carried to the upper end of the unit in a fluidized stream. Thus, the conversion of relatively heavy hydrocarbon oil fractions or other high boiling reactants may be carried out effectively within the unit when charged thereto in the liquid or mixed phase.

The concurrent downward flow of the catalyst particles with the reactant stream in the upper reaction zone permits the maintenance of a varying depth bed of material within that zone, as well as permitting a readily adjustable contact time between the streams of reactant and solid particles. Where it is desired to maintain a relatively long contact time, a deep compact descending bed of the particles and reactant stream may be maintained within the elevated reaction zone. On the other hand, a relatively shallow bed of material may be maintained in the elevated contacting zone where it is desired to have short contact time. Since concurrent flow and long contact time may be obtained in the improved flow, a particular advantage is obtained in that catalyst to reactant ratios need not be high in order to achieve the desired conversion with reasonable reactant and catalyst inlet temperatures. When cracking heavy hydrocarbon oils, low catalyst to oil ratios are desirable to prevent overcracking of the hydrocarbon reactant stream and to prevent excessive coke deposition on the catalyst particles. However, it is in general desirable to impart sufficient carbonaceous deposit on the catalyst particles during the conversion reaction to provide the heat requirements for the conversion reaction by combustion of such deposits. In the present operation wherein the reactant stream passes upwardly in the confined path through the regeneration zone, a considerable amount of the heat may be supplied by indirect heat exchange through the transfer conduit to the reactant stream and catalyst particles passing therethrough to the elevated reaction zone.

In a more specific embodiment, in which the invention is directed to the catalytic conversion of a liquid hydrocarbonaceous reactant stream, the present method of operation comprises, maintaining a downwardly moving bed of finely divided solid catalyst particles in each of two contacting zones disposed in vertical alignment with one another, withdrawing heated catalyst particles downwardly from the lower portion of the lower zone, commingling the withdrawn heated particles with the liquid reactant stream, effecting substantial vaporization of the latter by heat contained in the hot particles and by indirect heat exchange with the bed in the lower zone and passing the resulting mixture upwardly in a confined straight line path through each of the catalyst beds maintained in the superimposed zones to the top portion of the upper contacting zone, passing the reactant stream and catalyst particles concurrently downwardly through the upper zone in a relatively compact dense phase bed, separately withdrawing resulting conversion products from the lower portion of the upper zone and passing the used catalyst particles therefrom into the upper portion of the lower contacting zone, passing an air stream at combustion temperature upwardly through the lower contacting zone countercurrently to the descending particles at a velocity sufficient to maintain the bed thereof in a fluidized state, discharging combustion gases from the upper portion of the lower zone and withdrawing oxidized and regenerated particles from the lower portion thereof as the aforesaid heated particles being commingled with the liquid reactant stream.

The arrangement of the contacting chambers, transfer lines, and control means in the present invention is such that an efficient compart unitary apparatus is provided to carry out the improved operation. Briefly, the apparatus of this invention comprises, the combination of a lower confined contacting chamber, an upper confined contacting chamber disposed in vertical alignment with the lower chamber, fluid inlet means at the lower portion of the lower chamber and fluid outlet means at the upper portion thereof, fluid outlet means at the lower portion of the upper chamber, the last-mentioned outlet means communicating with an intake or gathering device arranged within the lower portion of the upper chamber and adapted to withdraw gasiform products from a bed of solid particles, a discharge well for solid particles extending downwardly from the lower portion of each of the chambers, an open-ended vertical conduit extending upwardly from the lower portion of the lower discharge well through the lower chamber and the wells and through a major portion of the height of the upper chamber, fluid inlet means extending through the lower portion of the lower discharge well into the lower end of the open-ended conduit, and another conduit out of alignment with the open-ended conduit connecting the lower portion of the upper discharge well with the upper portion of the lower contacting chamber.

A valve or other flow controlling means may be positioned at the lower end of the open-ended conduit in order to control the flow of particles from the lower discharge well into the transfer conduit. A valve or other flow controlling means, is placed in the conduit transferring particles from the upper contacting chamber to the upper portion of the lower contacting chamber, whereby the rate of particle flow from the relatively compact bed in the upper chamber may be controlled as it passes to the fluidized bed in the lower chamber.

The arrangement of the transfer conduit and of the wells for withdrawal of solid particles from each of the contacting chambers constitute additional advantageous features of the system. The catalyst particles are withdrawn from each of the contacting chambers in elongated annular columns suitable for efficient stripping of the particles by a countercurrently upwardly flowing stripping stream of steam, flue gas, or other suitable inert gaseous medium. At the upper withdrawal well, the hot catalyst-containing stream passing upwardly in the transfer conduit imparts heat to the particles descending in the annular column, and a relatively high temperature stripping zone is thus maintained wherein vaporous or gaseous materials entrained by adsorption or occlusion on the solid particles descending from the upper chamber are stripped or expelled from these particles in a highly effective manner. A similar stripping action is secured in the lower discharge well with the aid of a stripping medium supplied at high temperature. The lower portion of the vertical riser conduit is positioned within the regenerating zone where oxidation of carbonaceous material on the solid particles imparts a relatively high temperature to the wall of the conduit whereby heat is supplied to the material passing upwardly through this conduit. As above noted, this heat exchange arrangement is of particular advantage in vaporizing a liquid charge mixing with the hot catalyst stream; undue cooling of the hot catalyst stream issuing from the lower discharge well by abstraction of the heat of vaporization of the liquid charge is counteracted by the heat transfer through the wall of the riser conduit, and the latter heat transfer aids in imparting to the ascending stream in the conduit the total heat requirements for both the rapid vaporization and the endothermic reaction. This arrangement is also very desirable for the reforming of a relatively light hydrocarbon stream, such as naphtha or gasoline fractions, wherein rapid heating of the charge to reaction temperature and reaction at a relatively high contact temperature are desirable.

The accompanying drawing illustrates a diagrammatic elevational view of a contacting unit suitable for practicing the method of the present invention, and the following description thereof will aid in showing the improved flow through the unit, as well as point out further advantageous features of the operation.

Referring now to the drawing, there is shown an upper contacting chamber 1, a lower contacting chamber 2 and a skirt or connecting section 3 suitable to support the upper chamber on the lower. The upper chamber 1 is adapted to maintain a downwardly moving relatively compact bed of subdivided catalytic material, the top of the bed being indicated by the broken line 4. The lower chamber 2 is adapted to maintain a fluidized bed of downwardly moving catalytic material, the top of the dense fluidized bed being indicated by the broken line 5.

For the purpose of simplification, the apparatus will be described with reference to a hydrocarbon oil conversion operation; thus, in the arrangement as illustrated and now to be described, the hydrocarbon charge to be reacted during contact with the catalyst is supplied to the unit through line 6 and control valve 7, either as a liquid, a vapor, or a mixture of both, and is introduced into a vertical conduit 8 which extends upwardly to the upper portion of the chamber 1. Freshly regenerated and reactivated catalyst particles are withdrawn from the lower portion of the regenerating zone within chamber 2 and pass downwardly through the withdrawal well 9 to the lower end of the transfer conduit 8 where they are commingled with the charge stream entering line 6. In a preferable arrangement, a sliding member 10 or other valve controlling means is provided at the lower end of the transfer conduit to regulate the flow of catalyst particles into the lower end thereof. The catalyst particles are transferred by the charge stream in a fluidized or suspensoid phase upwardly through the vertical riser conduit 8, wherein the conversion reaction is initiated and accomplished in part, to the upper portion of the reaction zone within chamber 1, wherein the mixed stream reverses in direction and the catalyst particles are permitted to descend into a relatively compact particle bed which moves downwardly concurrently with the reactant stream, while the conversion reaction is completed. It may thus be seen that the reactant stream contacts the catalyst particles in both a fluidized or suspensoid phase and a relatively compact phase of substantially higher density or solid particle concentration.

The resulting conversion products are withdrawn from the lower portion of the compact dense phase bed 4 through a suitable collecting header or ring 11, which permits the withdrawal of vaporous products from the particle bed without transferring any substantial amount of the solid material. The collector 11 may be an inverted through arrangement or alternately a form of conduit having perforations on the lower side thereof permitting the transfer of vaporous materials to line 12 having control valve 13. A withdrawal header particularly suitable for this purpose is formed by an inverted frustrated cone fitted at its upper, larger periphery tightly to the lower portion of the vertical wall of chamber 1 and depending into the annular space between the vertical chamber wall and the riser conduit 8, a substantially horizontal annular perforated plate or membrane being disposed within the cone in proximity of the smaller periphery of the frustum; with such withdrawal header, the line 12 is connected to the vertical wall of chamber 1 at a point between the annular membrane and the upper periphery of the inverted frustum.

The contaminated contacted catalyst particles pass downwardly around the withdrawal header 11 and are subsequently withdrawn from the lower end of the chamber 1 through an elongated discharge well 14, which in this embodiment provides an annular column of particles passing downwardly around the internal conduit 8. Preferably, the withdrawal well 14 also provides a stripping zone for removing adsorbed and occluded vaporous conversion products from the catalyst particles prior to their discharge into the regenerating zone. A suitable stripping medium, such as steam, nitrogen, flue gas or other relatively inert medium, is passed to the lower end of the stripping zone by way of line 15 and control valve 16. Suitable grids or perforated plates 17 are preferably spaced vertically throughout the withdrawal well and stripping zone 14, such that the particles passing countercurrently to the stripping medium may be redistributed and effect an efficient contact to result in the substantial removal of all occluded material. The stripping medium also serves to maintain the solid particles between the withdrawal header 11 and the well 14 in freely flowing state and is withdrawn with the fluid conversion products through the header 11.

The transfer of the contaminated catalyst particles from the upper reaction zone to the lower regeneration zone is made through a suitable conduit 18 having a control valve 19. The conduit 18 connects with the lower portion of withdrawal well 14 and discharges catalyst into the upper portion of the lower zone; the rate of discharge of the solid particles from the chamber 1 through the well 14 is controlled by the valve 19. It should also be noted that control valve 19 provides means for regulating the depth of the moving bed of material maintained within reaction zone 1, and as will be more fully described hereinafter, the depth of the bed 4 may be varied to suit a desired conversion operation, the type of charge stock, or alternately the type of catalyst being used in the operation. Thus, the level of the bed 4 may be maintained at any desired height between the upper end of the riser conduit 8 and a level somewhat above the withdrawal header 11.

In the regeneration zone within lower chamber 2, provision is made to contact the catalyst particles in a fluidized phase, with a regenerating gas being charged to the lower end of chamber 2 through line 20 having a control valve 21. The regenerating gas may be air or another free oxygen-containing gas stream suitable to burn and remove the carbonaceous deposits which contaminate the catalyst particles charged thereto. Preferably, as illustrated in this embodiment, a distributing grid 22, or baffles, are provided at the lower end of the contacting zone to distribute the regenerating gas into the descending bed of catalyst particles and to thus insure substantially uniform regeneration of the catalyst. The fluidized countercurrent contact is maintained by passing the regenerating gas or air stream through the particle bed at a sufficient velocity to cause the particles to be in a state of hindered settling, and to preferably maintain a zone in the upper part of the chamber 2 wherein a light catalyst phase exists, the light catalyst phase being of much lower particle density or concentration of solid particles than that maintained in the lower relatively dense fluidized phase, the top of which is represented by the broken line 5. Combustion gases formed by the burning and oxidizing operation are discharged from the upper end of the contacting zone through a particle separator 23, which may be of a mechanical or centrifugal type suitable to remove finely divided solid catalyst particles from the outgoing stream. Recovered solid particles are returned to the dense phase in the lower portion of the zone through dipleg 24, while the flue gas stream, substantially free of particles, is discharged from the upper end of the chamber through outlet conduit 25 having a control valve 26. If so desired, the countercurrent contact of the regenerating gas and descending catalyst particles may be aided by a number of vertically spaced substantially horizontal grids or perforated plates in the fluidized bed above the distributing grid 22.

The discharge of reactivated and regenerated particles from the chamber 2 is effected by means of the discharge well 9 at the lower end of the regeneration chamber 2. This discharge well forms a seal between the regenerating gas atmosphere within chamber 2 and the hydrocarbonaceous charge admitted to the system through line 6. As in the upper withdrawal well, the regenerated catalyst particles pass downwardly within the well 9 around the lower end of the internal conduit 8 such that the particles are in a descending annular column providing a uniform withdrawal from the regenerating zone and their substantially uniform introduction into the lower end of conduit 8. The elongated annular column of particles also provides means for effecting an efficient stripping of the particles to remove entrained free oxygen-containing gas prior to their entering the reaction zone. Steam or other suitable stripping medium such as for example a portion of hot flue gas, substantially devoid of free oxygen, from the line 25, may be charged to the lower portion of withdrawal well 9 through line 27 having a control valve 26. In a desirable embodiment of the unit, a series of distributing plates or grids 29 may be placed within the lower withdrawal well 9, as in the upper well 14, such that an efficient countercurrent contacting and stripping of the catalyst particles may be effected by the medium entering through line 27.

During a normal continuous operation applied in the described unit to a given conversion charge under substantially constant conditions of operation the quantity of catalyst in the system does not change materially. Minute amounts of catalyst may be carried away with the stream of reaction products withdrawn through line 12 and valve 13 and catalyst thus removed from the system may be separated from the reaction products in any suitable manner and either discarded or returned to the system. Thus, a particle separator of the mechanical or cyclone type may be connected to line 12, and particles recovered in such separator may be directed into the fluidized bed in chamber 2 by means not illustrated in the drawing. In many instances, the catalyst carried in the stream withdraw through header 11 and line 12 is in the form of extremely fine particles not desired in the unit, and they are in such case not returned thereto. Make-up quantities of catalyst compensating for this catalyst loss may be introduced to the system from time to time, preferably through a catalyst feeding and withdrawal conduit arranged to communicate with the fluidized bed in chamber 2. Such conduit is also desirable for adjusting, whenever required, the quantity of catalyst contained in the system, and for thereby permitting adjustment of the level of the relatively compact bed in chamber 1 without materially affecting the level of the fluidized dense phase bed in chamber 2.

In order to illustrate further the utility of the present method of converting a reactant stream, a hydrocarbon oil conversion operation will now be described wherein hydrocarbon oil to be cracked, such as a relatively heavy gas oil from a viscosity breaking operation or the distillate from a vacuum distillation of reduced crude oil, or a naphtha charge to be reformed, is charged to the lower end of the unit through line 6 as a liquid or as a partially preheated mixture of liquid and vapor. The charge is sprayed into the lower end of the conduit 8 and commingled with hot reactivated catalyst particles entering the lower end thereof from the regeneration zone 2. In this operation the oxidizing and burning within the regeneration zone normally is effected at a relatively high temperature of the order of 500° to 700° C. The temperature of the regenerated catalyst particles is generally sufficient to satisfy the heat requirements of the conversion carried out within the reaction zone with a temperature range of from 425° C. to 575° C.; however, it may be seen that in the present operation a temperature advantage is gained through heat transfer from the interior of the regenerating zone and the lower portion of the conduit 8 which passes upwardly through that zone. Thus, with additional heat gained through the heat exchange arrangement the liquid charge may be readily accommodated and its vaporization and heating to reaction temperature accomplished extremely rapidly and the catalyst still not subjected to an unduly high temperature within the regenerating zone to furnish both the latent heat of vaporization and the endothermic heat of the cracking or reforming reaction. The control valve 10 regulates the quantity of catalysts that enters the conduit 8 and mixes with the charge stream, thus the catalyst-oil ratio of the stream entering the upper elongated reaction zone may in turn be suitably regulated.

In the upper chamber 1, the depth of the descending bed of catalyst particles, which moves concurrently with the hydrocarbon vapor, is regulated by the control valve 19 in the outlet line 18 at the bottom of the chamber, as well as by the rate of flow to the chamber. For the less refractory charging stocks, it may be desirable to maintain a relatively shallow bed 4 within the upper contacting zone in order that the material not be overcracked and caused to lay down excessive amounts of coke on the catalyst particles.

The arrangement of the unit and the flow of the present invention, is as hereinbefore noted, particularly adapted to carry out high temperature conversion operation such as the reforming of gasoline and naphtha stocks. Hot catalyst particles from the regenerating zone and the reforming stock may be commingled at a temperature of the order of 450° to 600° C. within the lower end of the transfer conduit 8 and passed together in a fluidized phase to the upper end of the reaction zone within chamber 1. Here again the initial contact is made in a zone of high temperature which is in heat exchange contact with the interior of the burning zone. The time of contact between the catalyst particles and the reactant stream is readily controlled by varying the depth of the compact dense phase 4 by means of the control valve 19. Although not illustrated in the drawing, it is contemplated that a cooling coil or other cooling means may be incorporated in the lower portion of the regenerating chamber 2 in order to dissipate excess heat of regeneration not required in the conduit 8 and chamber 1. It is further contemplated that cooling means be provided either in chamber 1 in proximity of the withdrawal header 11, or outside this chamber in line 12 in order that the fluid conversion products may be subjected to a quench or rapid temperature reduction immediately upon completion of the desired conversion reaction. Thus, in a preferred mode of operation the hydrocarbon conversion products are quenched by direct injection of a liquid cooling medium, such as a refractory reflux condensate obtained from the conversion products, into the stream of vaporous conversion products passing through line 12.

The concurrent catalytic conversion flow of the present invention is of course not limited to reforming operations or to the conversion of liquid streams, in that it is adaptable to many processes converting organic materials. When several reactants participate in the desired conversion reaction they may be introduced to the riser conduit through the single supply conduit 6 or through several such supply conduits.

In the construction of the unitary apparatus of the improved form illustrated in the drawing, it may be desirable to have means for accommodating differential expansions between the conduits 8 and 18 and between these conduits, the superimposed chambers and the supporting skirt 3. In this embodiment, expansion joints 30 and 31 are shown in each of the respective transfer conduits 8 and 18, in order to provide independent means for accommodating the differential expansions. Further, while the apparatus shown is particularly adapted to accommodate concurrent flow through the reaction zones, a relatively dense moving bed in the upper zone and a fluidized moving bed in the lower regenerating zone, it is not intended to limit the construction of the compact unitary apparatus to the exact proportions of features that have been shown and described. Obviously, the types of distributing baffles, particles separating means, and valves and the like may be varied somewhat to suit the particular purposes of the unit without departing from the scope of the invention.

I claim as my invention:

1. A method for catalytically converting a liquid hydrocarbonaceous reactant stream which comprises, maintaining a downwardly moving bed of finely divided solid catalyst particles in each of two contacting zones disposed in vertical alignment with one another, withdrawing heated catalyst particles downwardly from the lower portion of the lower zone, commingling the withdrawn heated particles with said liquid reactant stream, effecting substantial vaporization of the latter by heat contained in said heated particles and by indirect heat exchange with the bed in said lower zone and passing the resulting mixture upwardly in a confined straight line path through each of the catalyst beds in said superimposed zones to the top portion of the upper zone, passing the reactant stream and catalyst particles as a suspension downwardly through the other portion of said upper zone and then into the catalyst bed in the upper zone, separately withdrawing resulting conversion products and used catalyst particles from the lower portion of said upper zone and passing the used catalyst particles therefrom into the upper portion of said lower zone, passing an air stream at combustion temperature upwardly through the lower zone countercurrently to the descending particles at a velocity sufficient to maintain the bed thereof in fluidized state, discharging combustion gases from the upper portion of the lower zone and withdrawing oxidized and regenerated particles from the lower portion thereof as the aforesaid heated particles being commingled with said liquid reactant stream.

2. A method for catalytically converting a fluid hydrocarbonaceous reactant stream which comprises, maintaining a downwardly moving bed of finely divided solid catalyst particles in each of two contacting zones disposed in vertical alignment with one another, passing a regenerating gas upwardly through the bed in the lower contacting zone at a sufficient velocity to maintain said bed in a turbulent fluidized phase therein, removing resultant regeneration gases from the upper portion of the lower contacting chamber and withdrawing regenerated solid catalyst particles downwardly in a first annular column from the lower portion thereof, discharging regenerated particles from said annular column into said reactant stream and passing the mixture upwardly in a confined straight line path through said annular column and the lower contacting zone and through substantially the height of the bed in the upper contacting zone and discharging the same into the top portion of the last-mentioned zone, subsequently passing said reactant stream and solid particles as a suspension in a downward direction through the other portion of said upper zone and then into the catalyst bed in the upper zone, separately withdrawing resulting conversion products and used catalyst particles from the lower portion of said upper zone and passing the used catalyst particles therefrom downwardly in a second annular column of smaller cross-sectional area than that of the dense phase bed within said upper zone, maintaining said second annular column in indirect heat exchange with said confined path of said upwardly flowing mixture, and discharging used particles from said second annular column into the upper portion of said lower contacting zone and the top portion of the fluidized bed therein.

3. The method of claim 2 further characterized in that a stream of stripping medium is introduced to said first annular column, another stream of stripping medium is introduced to said second annular column and said streams are passed upwardly through said columns countercurrently to the solid particles therein at such a rate that vaporous and gaseous materials entrained from the superimposed contacting zones are expelled from said particles prior to their discharge from said annular columns.

4. A unitary apparatus comprising in combination, a lower confined contacting chamber, an upper confined contacting chamber disposed in vertical alignment with said lower chamber, fluid inlet means at the lower portion of said lower chamber and fluid outlet means at the upper portion thereof, a vapor collecting header arranged within the lower portion of said upper chamber and having vapor outlet means communicating therewith to withdraw gasiform fluid from a descending bed of solid particles, a discharge well for solid particles extending downwardly from the lower portion of each of said chambers, an open-ended vertical conduit extending upwardly from the lower portion of the lower discharge well through said lower chamber and said discharge wells and through a major portion of the height of said upper chamber, fluid inlet means extending through the lower portion of the lower discharge well into the lower end of said open-ended conduit, and another conduit out of alignment with said open-ended conduit connecting the lower end of the upper discharge well with the upper portion of said lower chamber.

5. The apparatus of claim 4 further characterized in that a flow control means is connected to the lower end of said open-ended conduit, a flow control valve is placed within said conduit that is out of alignment with said open-ended conduit, and a stripping fluid inlet connects with the lower end of each of said discharge wells.

6. A unitary apparatus comprising in combination, a lower confined vertically elongated contacting chamber, an upper confined, vertically elongated contacting chamber, disposed in vertical alignment with said lower chamber, fluid inlet means at the lower portion of said lower chamber and fluid outlet means at the upper portion thereof, a vapor collecting header arranged within the lower portion of said upper chamber and having vapor outlet means communicating therewith to withdraw gasiform fluid from a descending bed of solid particles, a discharge well for solid particles extending downwardly from the lower central portion of each of said chambers, an open-ended vertical conduit extending upwardly from the lower portion of the lower discharge well centrally through said lower chamber and said discharge wells and centrally through a major portion of the height of said upper chamber, fluid inlet means extending through the lower portion of the lower discharge well into the lower end of said vertical open-ended conduit, and another conduit out of alignment with said open-ended conduit connecting the lower end of the upper discharge well with the upper portion of said lower chamber.

7. A method for catalytically converting a fluid hydrocarbonaceous reactant, which comprises maintaining a descending bed of subdivided solid catalyst particles in each of a lower confined regeneration zone and an upper confined reaction zone disposed in vertical alignment with one another, withdrawing a stream of heated catalyst particles downwardly from the lower portion of the regeneration zone and commingling the same with a stream of said hydrocarbonaceous reactant, directing the resulting mixture upwardly as a suspension in a confined straight line path extending through each of said catalyst beds to the top portion of said upper reaction zone, effecting a substantial portion of the conversion of said reactant in said straight line path while maintaining the latter in heat exchange relation with the lower catalyst bed, reversing the direction of flow of the suspension of catalyst particles and partially converted reactant issuing from said straight line path in the upper portion of said upper zone so as to pass said catalyst particles and partially converted reactant downwardly into the upper catalyst bed and then concurrently downwardly with the latter and therein completing said conversion, separately withdrawing a fluid conversion product stream and used catalyst particles from the lower portion of the bed in said upper zone and passing the used particles therefrom downwardly through an annular stripping zone of restricted cross-section along an intermediate portion of said straight line path and then by gravitational downflow into the upper portion of the bed in said regeneration zone, continuously passing an oxygen-containing regenerating gas through the descending bed in said regeneration zone and therein burning contaminants from the catalyst and producing said heated catalyst particles, and continuously discharging used regeneration gas as a separate stream from said regeneration zone.

8. A method for catalytically converting a liquid hydrocarbonaceous reactant stream, which comprises maintaining a descending bed of subdivided solid catalyst particles in each of a lower confined regeneration zone and an upper confined reaction zone disposed in vertical alignment with one another, withdrawing a stream of heated catalyst particles downwardly from the lower portion of the regeneration zone, commingling the withdrawn heated particles with said liquid reactant stream, affecting substantial vaporization of the latter by heat contained in said particles and by indirect heat exchange with the lower catalyst bed, passing the resulting mixture as a suspension upwardly in a confined straight line path extending through each of said catalyst beds to the top portion of said upper reaction zone and partially converting said reactant in said path, reversing the direction of flow of the mixed stream issuing from said straight line path in the upper portion of said reaction zone so as to direct the particles and vaporous components of said mixed stream downwardly into the upper catalyst bed and then concurrently downwardly with the latter and therein completing said conversion, separately withdrawing a vaporous conversion product stream and used catalyst particles from the lower portion of the bed in said upper zone and passing the used particles therefrom downwardly through an annular stripping zone of restricted cross-section along an intermediate portion of said straight line path and then by gravitational downflow into the upper portion of the bed in said regeneration zone, continuously passing an oxygen-containing regenerating gas through the descending bed in said regeneration zone and therein burning contaminants from the catalyst and producing said heated catalyst particles, and continuously discharging used regeneration gas as a separate stream from said regeneration zone.

9. A contacting apparatus comprising a lower confined contacting chamber, an upper confined contacting chamber disposed in vertical alignment with said lower chamber, fluid inlet and outlet means at vertically spaced portions of said lower chamber, a single vapor collecting header in said upper chamber, said vapour collecting header being arranged within the lower portion of said upper chamber and having outlet conduit means communicating therewith to withdraw gasiform fluid from the lower portion of a descending bed of solid particles, a lower discharge well for solid particles extending downwardly from the lower portion of said lower chamber, a vertical conduit communicating at its lower end with the lower portion of said lower discharge well and at its upper end with said upper chamber and extending upwardly through said lower chamber and through a major portion of the height of said upper chamber, an upper discharge well having a substantially cylindrical vertical confining wall of substantially smaller diameter than each of said chambers, said upper discharge well extending vertically downwardly from the lower portion of said upper chamber annularly around said vertical conduit so as to form a vertically elongated passageway for the withdrawal of solid particles from the upper chamber as a descending annular column in heat exchange relation with an intermediate portion of said vertical conduit, a particle discharge port connecting the lower portion of said upper discharge well with the upper portion of the lower chamber, and fluid inlet means arranged at the lower portion of said lower discharge well to direct solid particles from the latter in admixture with a fluid stream into the lower end of said vertical conduit.

10. A contacting apparatus comprising a vertically elongated shell having an upper contacting section and a lower contacting section disposed in vertical alignment and each adapted to contain a bed of solid particles, fluid inlet and outlet means at vertically spaced portions of said lower section, a single vapor collecting header in said upper section, said vapor collecting header being arranged in the lower portion of said upper section and having vapor outlet means communicating therewith for withdrawing vaporous fluid from a descending bed of solid particles, a lower discharge well for solid particles extending downwardly from the lower portion of the lower section, a vertical conduit communicating at its lower end with the lower portion of said lower discharge well and extending from below the lower section centrally through the latter and through a major portion of the height of the upper section, said conduit being open at its upper end within the upper section, fluid inlet means arranged at the lower portion of said lower discharge well to direct solid particles from the latter in admixture with a fluid stream into said vertical conduit, an upper discharge well extending downwardly from the lower portion of the upper section below said vapor collecting header and communicating at its lower end with the upper portion of said lower section, said upper discharge well having a vertical confining wall cylindrically spaced around an intermediate portion of said vertical conduit so as to define an annular passageway of substantially smaller cross-section than each of said sections for the withdrawal of solid particles from the upper section as a descending annular column along and around said intermediate portion of the vertical conduit, and fluid inlet means at said vertical cylindrical wall for introducing a fluid stripping medium to said annular passageway.

FREDERICK W. LEFFER.

REFERENCES CITED

The following references are of record in the file of this patent:

UNITED STATES PATENTS

| Number | Name | Date |
| --- | --- | --- |
| 2,289,329 | Prickett | July 7, 1942 |
| 2,347,747 | Melaven | May 2, 1944 |
| 2,408,600 | Berg | Oct. 1, 1946 |
| 2,412,152 | Huff | Dec. 3, 1946 |
| 2,418,679 | Utterback | Apr. 8, 1947 |
| 2,459,824 | Leffer | Jan. 25, 1949 |
| 2,460,219 | Eastwood | Jan. 25, 1949 |
| 2,487,961 | Angell | Nov. 15, 1949 |